Figure 3:
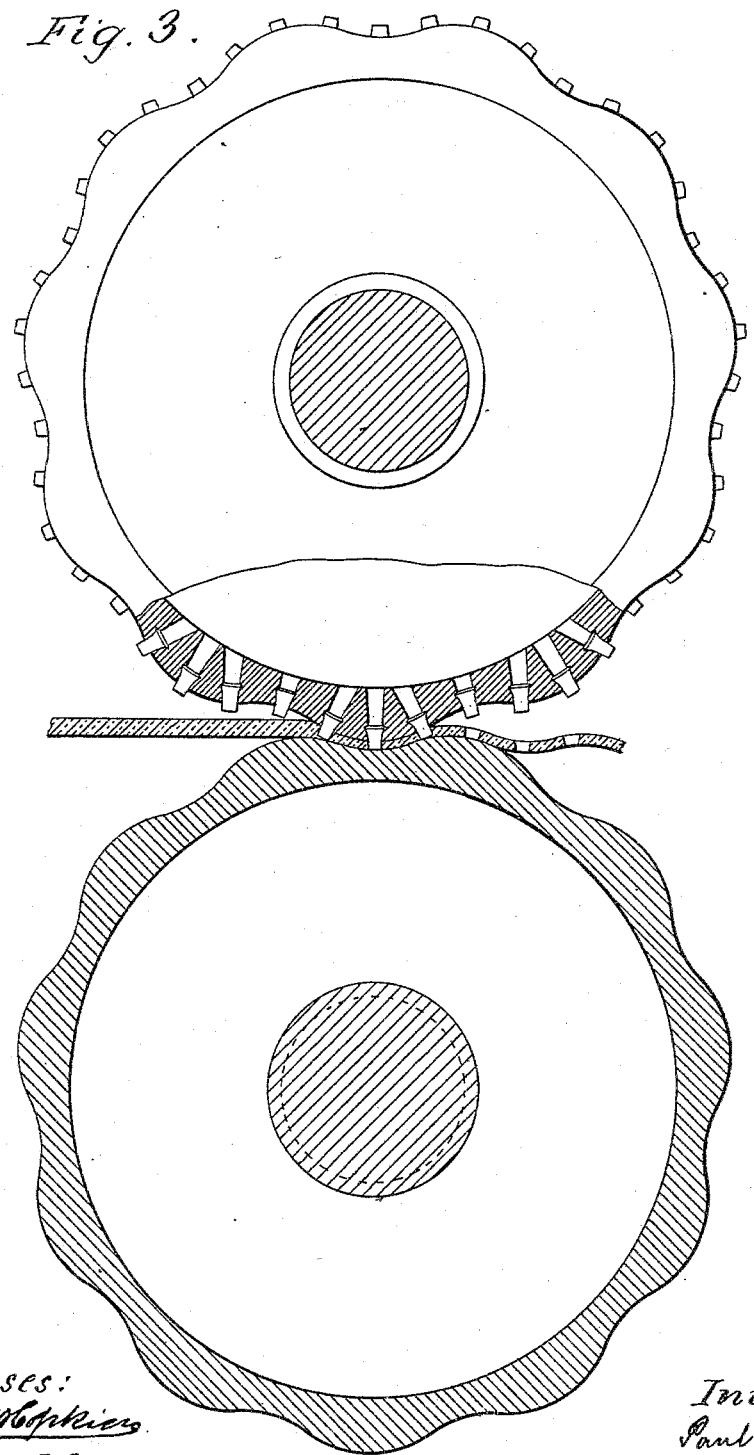

(No Model.) 2 Sheets—Sheet 1.
P. SIMON.
MACHINE FOR THE MANUFACTURE OF PLATE GLASS.
No. 425,348. Patented Apr. 8, 1890.
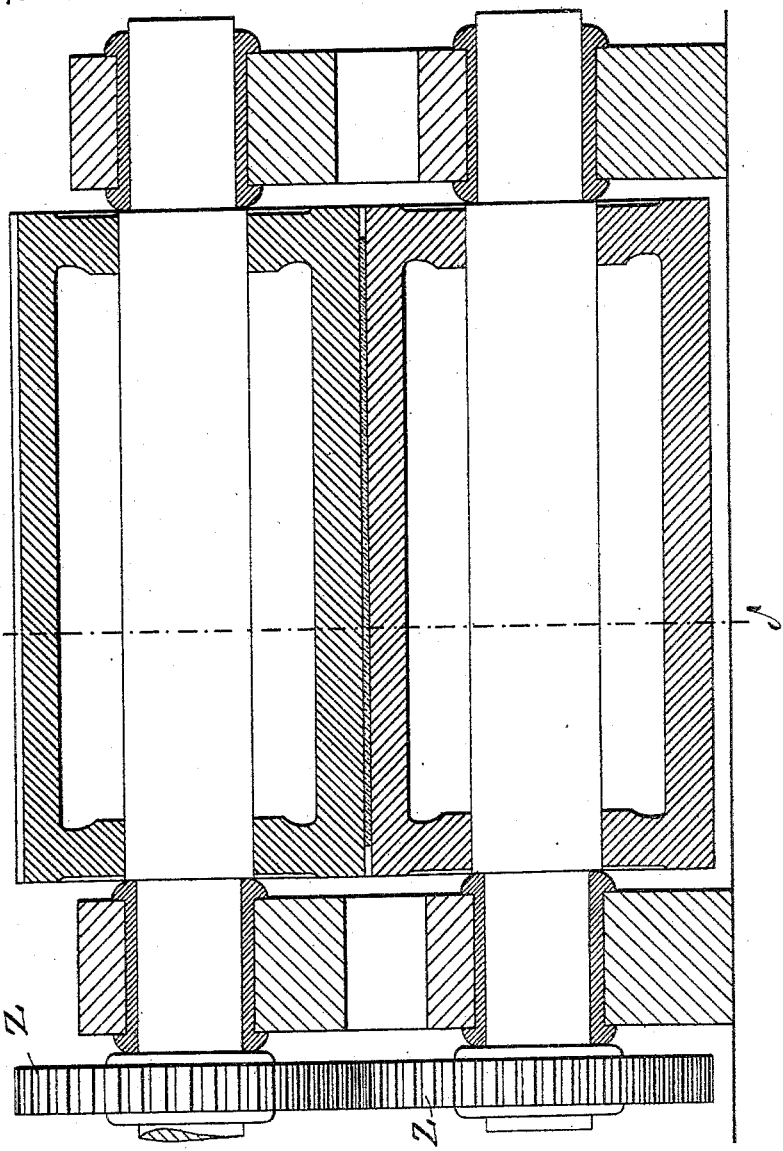
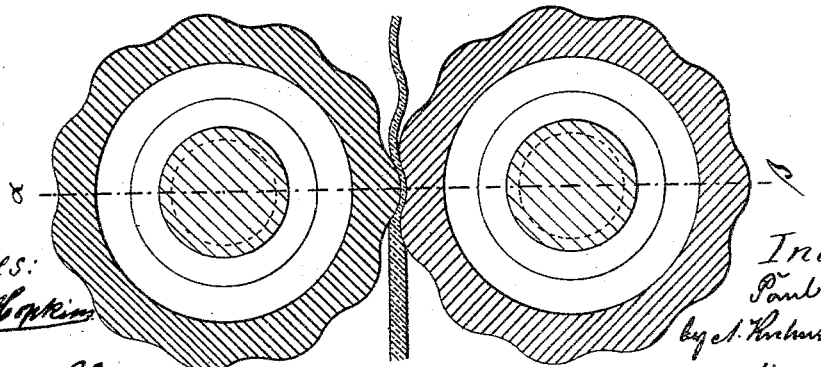

(No Model.) 2 Sheets—Sheet 2.

P. SIMON.
MACHINE FOR THE MANUFACTURE OF PLATE GLASS.

No. 425,348. Patented Apr. 8, 1890.

Witnesses:
Gustave W. Hopkins
Theodor Heese

Inventor:
Paul Simon.
by A. Kirchner & R. Dufour
attorneys.

UNITED STATES PATENT OFFICE.

PAUL SIMON, OF SULZBACH, NEAR SAARBRÜCKEN, PRUSSIA, GERMANY.

MACHINE FOR THE MANUFACTURE OF PLATE-GLASS.

SPECIFICATION forming part of Letters Patent No. 425,348, dated April 8, 1890.

Application filed April 29, 1889. Serial No. 309,109. (No model.)

*To all whom it may concern:*

Be it known that I, PAUL SIMON, gentleman, a subject of the King of Prussia and of the German Emperor, residing at Sulzbach, near Saarbrücken, in the country of the Rhine, Kingdom of Prussia, German Empire, have invented some new and useful improvements in Machines for the Manufacture of Plate-Glass, of which the following is a full and clear description.

The processes known up to the present for rolling plate or looking glass between plain rollers has the disadvantage that the glass will not pass through between the rollers at the proper consistency. On being made softer it passes through but retains its rough surface, just as in the case of cast-glass. The soft glass on being rolled rises into waves on having passed the line of pressure of the roller, because it is too soft to push its weight farther, and thus rolled glass has always a more or less waved and rough surface.

In order to attain the certain passing of the glass plate through the rollers, I use rollers with their surface waved, these waves running parallel to the axis of the said rollers, and the wave of the one roller when they are in motion passes in the hollow of the other, so that the space between the two rollers remains constant and the plate will not receive varying thicknesses. By means of these rollers it is possible to roll the glass while in a firmer condition than in the case of plain rollers. On emerging from between the rollers the glass, however, is not conducted horizontally away from the same, otherwise the waves would remain and the plate would not be smooth; but it is conducted slanting downward, so that its own weight straightens out the waves on its downward passage. The rollers can be arranged horizontally and the glass passed through from above without altering the principle of my invention.

In order to make my invention more clear, I refer to the accompanying drawings, in which similar letters denote similar parts throughout the several views.

Figure 1 is a section on $\phi \delta$, Fig. 2. Fig. 2 is a section on $\alpha \beta$, Fig. 1. Fig. 3 shows a modification.

The glass is pressed between one or more pairs of these waved rollers, Fig. 1. As will be seen from the drawings, these rollers are so arranged that the space between them is always the same. They are driven by cog-wheels $z\ z$, of course both at the same speed. The pairs of rollers can of course be placed horizontally or slanting. If several pairs of rollers are used, lying one over the other, they may have a different speed—that is to say, the different pairs—but of course the two rollers of a pair must have the same speed. Plain rollers may also be used between them for transporting the glass plate. The larger and smoother the roller-waves, so much better will be their working. It is further possible to warm these rollers or to cover them with oil to prevent their stopping. The rolled plates are then worked in the generally known manner—viz., pressed between two plates and then taken up and hung up or laid on slanting plates or endless bands (as in the case of iron plates) or laid on trolleys running under the rollers, to be transported to the annealing-furnace, where the glass will be treated in the same manner as blown plate-glass rolls—viz., warmed until it has again become soft, in order that it may again receive its glance and smoothness. If one of the waved or plain rollers has hollow punches on its surface, perforated glass for ventilating purposes may be manufactured, Fig. 3. These waved rollers can be used with particular advantage in the case of the flat ovens, which are now everywhere coming into use, as the glass can be continually passed from the oven to the rollers to be worked. With regard to the dimensions of the rollers, the most general are about one foot nine inches in diameter and about seven feet long, and the waves may be deep or shallow.

Having now fully described and ascertained my invention, what I claim as my invention, and desire to secure by Letters Patent of the United States, is—

In machines for manufacturing glass, the combination of two or more waved rollers, having the waves running parallel with their longitudinal axis, for the purpose substantially as described.

In witness whereof I have hereunto set my hand in presence of two witnesses.

PAUL SIMON.

Witnesses:
 DR. LANGYUTH,
  *Chemist.*
 C. SIMON,
  *Bautechniker.*